Nov. 7, 1950 F. R. ARNOLD 2,529,123
STORAGE BATTERY CHARGING SYSTEM
Filed Oct. 18, 1946 4 Sheets-Sheet 2

Inventor
Frank Robert Arnold
By *Clarence A. O'Brien*
and *Harvey B. Jacobson*
Attorneys Nov. 7, 1950     F. R. ARNOLD     2,529,123
STORAGE BATTERY CHARGING SYSTEM
Filed Oct. 18, 1946     4 Sheets-Sheet 3

Inventor
Frank Robert Arnold

Patented Nov. 7, 1950

2,529,123

UNITED STATES PATENT OFFICE 2,529,123

STORAGE BATTERY CHARGING SYSTEM

Frank Robert Arnold, Detroit Lakes, Minn.

Application October 18, 1946, Serial No. 704,123

15 Claims. (Cl. 320—24)

This invention relates to storage battery charging systems embodying an automatic control of the charging rate and it has for its principal object to provide a battery charging system which permits the charging of a battery at the maximum allowable charging rate during the entire charging period. This maximum allowable charging rate varies continuously with the state of discharge (or charge) of the battery. It is therefore, a further main object of the invention to provide a system and means of automatically varying the rate of charging of the battery during the entire charging period or during a major fraction of the same, in accordance with the prevailing state of the discharge or state of charge of the battery.

It is a well known fact that lead batteries have to be charged at a diminishing rate, starting with a charging current which is of greater intensity than the current at the end of the charging period. Known systems for the automatic charging of batteries, however, operate the regulating means for the current in proportion with the charging time which has elapsed. The charging time is selected arbitrarily according to the maximum time available or according to any other arbitrary ruling and the charging operation is then conducted by means of apparatus varying the rate of charge directly in proportion to the time elapsed by means of a clock work or by some other time responsive device. It is not possible, however, to obtain by these means a charging rate which will be, at every instant, a maximum within those limits which, as extensive tests and experience have indicated, must not be exceeded if damage to the battery and inefficient use of electrical energy, resulting from excessive gassing and high temperatures and produced by charging rates exceeding the allowable maximum of the charging rate, are to be avoided. The other extreme is a charging rate which is lower than necessary and which produces a waste of time.

It is therefore an object of this invention to maintain the charging rate at the maximum which experience and tests have shown to be allowable and as this maximum allowable charging rate is variable, the charging rate according to the invention is a varying rate changing continuously during the charging process in accordance with the changing state of charge of the battery until a so called finishing rate is reached.

According to the invention, the rate of charge of the battery is varied, as above explained, so as to be exactly proportional to the variation of the state of discharge of the battery for the time being, and as this state of discharge proves to be an exponential function of the time during which a battery is charged under the above conditions, a regulation has to be introduced which, when time operated, causes variations of the rate of charging which are an exponential function of the time.

According to the invention this regulating means consists essentially in a resistor with a variable area, the variation being an exponential function of the length, which resistor is inserted into the charging circuit and is made active along a variable portion of its length by means of a movable contact; and it consists moreover in means for keeping the voltage drop within the active, current conducting portion of the resistor at a constant value.

The principles on which the invention is based and many further objects will be apparent from the following specification illustrating one embodiment thereof.

This embodiment of the invention is also shown in the drawings. It will be clear, however, to the expert that the specific means described and shown are examples. The invention is adaptable to many systems of charging batteries and each adaptation represents an embodiment of the invention. The invention is therefore described and explained in such a way that the principles may be understood or can be deduced without difficulty by the expert. The adaptations or embodiments of the invention which are derived from these principles, as laid down in the specification and in the annexed claims are therefore not departures from but parts of the invention.

In the accompanying drawings:

Figure 8 is an elevational partly cross sectional view of the movable contact arrangement, the resistor with a variable cross section, the contact carriage and other units, the cross section being taken along line 8—8 of Figure 1.

The invention is based on the principle that the maximum rate of charging a lead battery must not at any instant exceed a number of amperes which is equal in magnitude to the number of ampere-hours of discharge at this instant until the current has been diminished to the so called "finishing rate" after which it may be held constant until the charge is completed. This relationship is commonly referred to as the "ampere-hour law" of charging. If a battery has arrived at a certain state of discharge, by any manner whatsoever, such that its condition of discharge may be expressed as being equivalent to a number of ampere-hours, the initial charging rate at the instant at which charging is commenced may be numerically equal, in amperes, to the number of ampere-hours measuring the state of discharge at said instant. However, when the ampere-hour law is followed which sets the safe upper limit on charging rates which will not damage the battery this comparatively high initial rate must not be maintained. To obtain the ideal maximum charge in the shortest possible time without damage to the battery the rate of charge must be varied continuously so that it is always kept at a numerical value equal in amperes to the number of ampere-hours of discharge then existing. Since the state of discharge of a battery which is in the process of being charged is obviously decreasing during such charge, the charging rate must decrease correspondingly if the most effective use of power, time, and safety for the battery is to be obtained.

A continuous control of the rate of charge during the charging operation has been the rule in automatic charging arrangements now in use; but this control always produced variations which were in proportion to time or to temperature. The charging rates therefore do not follow and frequently greatly exceed or are greatly below the limits which are defined by the above explained "ampere-hour law." In order to charge a battery at the maximum allowable rate and in order to obtain the most complete charge in the shortest possible time without any damage caused by excessive gassing or temperature rise in the battery which dislodges the active chemical, warps the battery elements so as to cause short circuits, and wastes energy, the charging rate must be varied with the varying state of discharge of the battery while it is being charged. This variation is not a simple linear function of the charging time. If the above stated principle is to be realized the law that must be followed by the charge has to be established first.

Applicant has now discovered that it is a condition of proper and effective charging of a battery that the charging rate of the battery in amperes be kept numerically at all times to the instantaneous state of discharge of the battery measured in ampere-hours from a previously fully charged condition. It was also found that such a condition will result in the charging current being varied with respect to time according to an exponential law.

The exponential curve $a$ (Figure 3) represents the maximum instantaneous charging rate according to applicant's invention.

Figure 3:
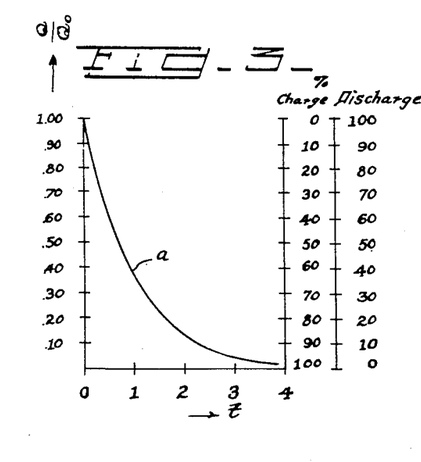
Figure 3 is a chart or diagram showing the way in which the state of discharge or the maximum charging rate varies with time during charging.

As well known the curve is asymptotic towards the $t$-axis.

This does not influence the caluculations as the charge reaches the finishing rate at a certain value and from this point the battery is charged at the finishing rate during a fixed predetermined period of time, theoretically one hour.

The ordinate in each point (according to well known theorems) is proportional or equal to the area enclosed by the said ordinate, the $t$-axis and the asymptotic branch of the curve. This area is equal to the area of a rectangle represented by the ordinate multipled by one unit of time. It is a measure of the number of ampere hours with which the battery has to be charged at this point to attain the completely charged state.

From the above explanation it will be seen that an automatic charging device with a maximum instantaneous charging rate in amperes, always equal to the existing instantaneous state of discharge in ampere hours, is possible, provided the charging rate when viewed as a function of time follows the above explained exponential law.

The automatic charging device according to the invention in order to realize the above named conditions, uses as a means for obtaining the desired maximum charging rate, a charging circuit, containing a contact movable at constant speed along a resistor of diminishing cross section, and a means for maintaining a constant voltage along the portion of the said resistor which forms part of the said charging circuit. The device according to the invention therefore essentially consists of a charging circuit 1, 2, 3 for charging the battery 4, of a means for furnishing electric power 5, indicated in the diagram (Figure 1) as a motor-generator, but which may comprise a power line bus bar or an engine driven generator, of a resistor with a variable cross sectional area, generally indicated at 20, forming part of the said charging circuit, of a movable contact arrangement sliding along said resistor at constant speed, and generally indicated at 22, of a voltage regulator generally indicated at 10, regulating the voltage in such a way that the voltage drop of that portion of the variable area resistor 20 which is part of the circuit 1, 2, 3, is constant, of a motor 26 driving the movable contact at a constant speed, of a finishing rate contact and selective arrangement, generally indicated at 50, for charging the battery at a preselected finishing rate during a predetermined period of time, of a contact arrangement 56, 58 to be operated at the termination of the charging operation and of an indicator or switching off circuit 60 either announcing the completion of the operation or terminating it automatically by opening the charging circuit.

Figure 1:
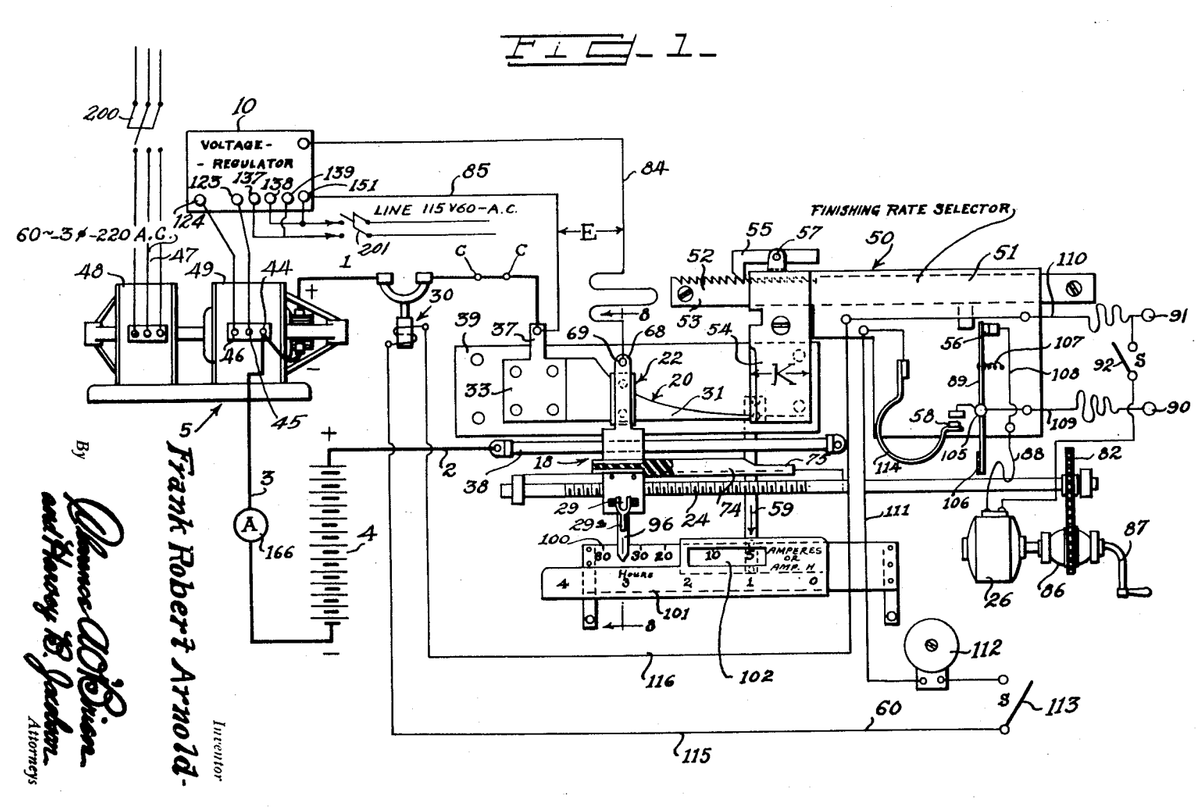
Figure 1 is a diagram illustrating the principle and showing the co-operation of the units and the electric connections.

Describing now these devices forming the components of the automatic charging arrangement in detail, it will be understood that the motor generator 5 or the power mains from which the charging current is taken, or the other source of power and the circuit 1, 2, 3 are conventional and need no description.

With a motor generator, consisting of a motor 46 supplied from the mains 47 and of a generator 49, the means for regulation of the voltage of the power supply consists in the regulation of the field of the generator, not shown but supposed to be connected with the terminals 46, 45, in such a manner that the generator field is in series with the circuit of the voltage regulator connected with the terminals and to be described below.

The branch 1 of the charging circuit contains the switch 30, operated by the circuit 60 and described below.

Figure 4:
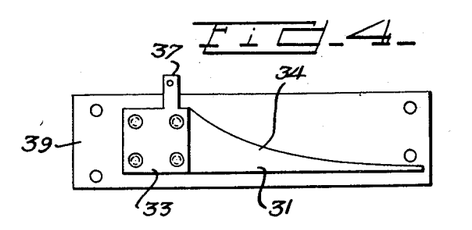
Figures 4 and 5 show a side view and a plan view respectively, of a resistor with a varying sectional area.
Figure 5:
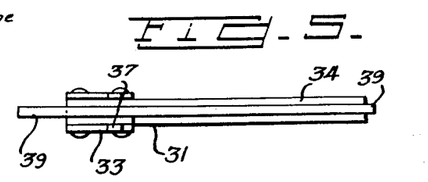
Figures 5, 6, 7:
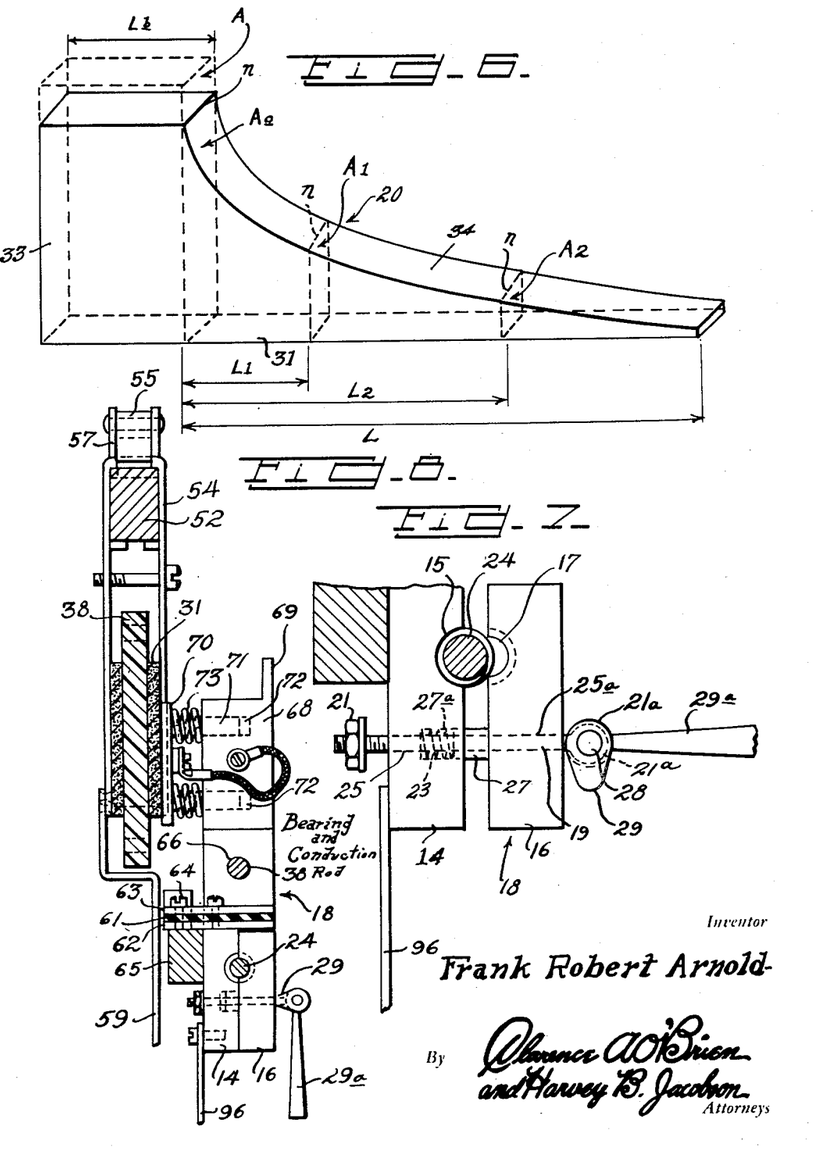
Figure 6 is a perspective view of a modification of a resistor of this type.
Figure 7 is a partial elevational side view of a contact carriage used for the movable contact, co-operating with the contact shown in Figures 4 and 5.

The variable area resistor 20, consists, as shown in Figures 4 and 5, of a conducting body 31 comprising two sections 33 and 34. The base section 33 is a section of constant cross sectional area. As shown in Figures 4 and 5 and in Figure 6 in full lines, by suitable choice of dimensions its cross sectional area may be made equal to the largest cross sectional area of section 31 or it may be made larger as indicated in Figure 6 in dotted lines, but in either case the dimensions of the base section must bear definite relationship to the cross sectional area of the second section.

The section 34, however, shows cross sectional areas $A_0$ $A_1$ $A_2$, diminishing with the increase of their distance L from the base area $A_0$. The rate at which the cross section diminishes has to be selected in conformity with the above explained conditions, and the curved part will follow an exponential law.

The resistor body may be made of any suitable material, as the resistivity of the material does not figure among the conditions which determine the shape of the section or the cross sectional area at a given point. It may therefore be made of metal or preferably of carbon or of any suitable composition. It is held within a shield 39 of insulating material and projects on both sides from this shield so that the lateral faces are freely accessible and one of them or both may come into contact with the sliding contact 22.

The section 33 is provided with a contact terminal lug 37 for attaching the power conductor and the conductor 85 of the voltage regulator 10. Said lug is preferably located in such a way that the resistance of the section between the point at which the current enters and the cross section $A_0$ which is the initial cross section 34 does not influence the voltage E between conductors 84 and 85 which has to be kept at a constant value.

Along the resistor with the variable cross sectional area 20 a sliding contact 22 is moved, preferably at a constant speed or rate of movement. The contact is carried by a carriage 18 from which two blocks 14 and 16 provided with bores, are depending. Bore 15 in block 14 may be a smooth bore while bore 17 in block 16 is screw threaded, the threads engaging a screw spindle 24.

Block 14 forms part of the carriage 18 or is fixedly connected therewith in a manner to be described, while block 16 may be moved laterally away from block 14 or towards said block, whereby the screw threaded portion 17 is moved into engagement or out of engagement with the spindle 24.

To cause engagement of block 16 with the screw spindle 24 and to couple block 16 with block 14 a pair of movable spindles 19 is provided, each carrying a head or a nut 21 at one end and provided with an eye 21a at the other end. The eyes are joined by a cross spindle 28 carrying a cam 29 connected with a handle 29a. The block 16 may be provided with pins or sleeves 27, protruding from its face and engaging corresponding bores 27a on block 14, which act as guides. From Figures 7 and 8 it will be clear that when the handle 29a is turned and is moved from the position shown in Figure 7 into the position shown in Figure 8, the cam 29, which is turned with the handle, finding its support on the block, will push the cross spindle 28 outwardly and will therefore press block 16 towards block 14. The pins or sleeves 27 act as guides. If necessary small compression springs 23 may be inserted in order to move the block 16 back, when the handle is in the release position of Figure 7.

The connection between block 14 and carriage 18 preferably comprises insulating plates or sheets 61. It may include flanges 62 and 63 projecting laterally from block 14 and the carriage 18 respectively which are secured to each other mechanically but insulated electrically by insulation sheets or plates 61 inserted between them. The flanges may be held together by screws 64. The insulation is provided because the carriage 18 is a current carrying part. It is provided with a bore 66 into which a contact bar 38 is fitted for good electric contact. The contact bar, as seen from Figure 1, is directly connected with the branch 2 of the charging circuit.

The upper part 68 of the carriage has the form of a standard and carries a contact shoe 70 by means of pins 71 fitting into corresponding bores or holes 72 of the upper carriage section 68. Springs 73 inserted between the carriage and the shoe 70 press the latter outwardly against the surface of the variable area resistor 31.

The flanges 62 may be used as supporting means and may slide on a bearing rail 65 guiding and supporting the carriage. Further support is furnished by the contact bar and also by the screw spindle during movement.

The carriage as shown in Figure 1 moreover carries an insulating contact operating rod 74 which is provided with an end portion 75 of reduced size for a purpose to be described.

To the upper end 68 of the carriage the conductor 84 leading to the voltage regulator 10 is connected. The voltage regulator, therefore, as hereinafter described, keeps constant the voltage between the initial or entrance section of the resistor 20 at lug 37 and the movable contact 22 by regulating the excitation of the charging generator 49.

Figures 9, 10, 11:
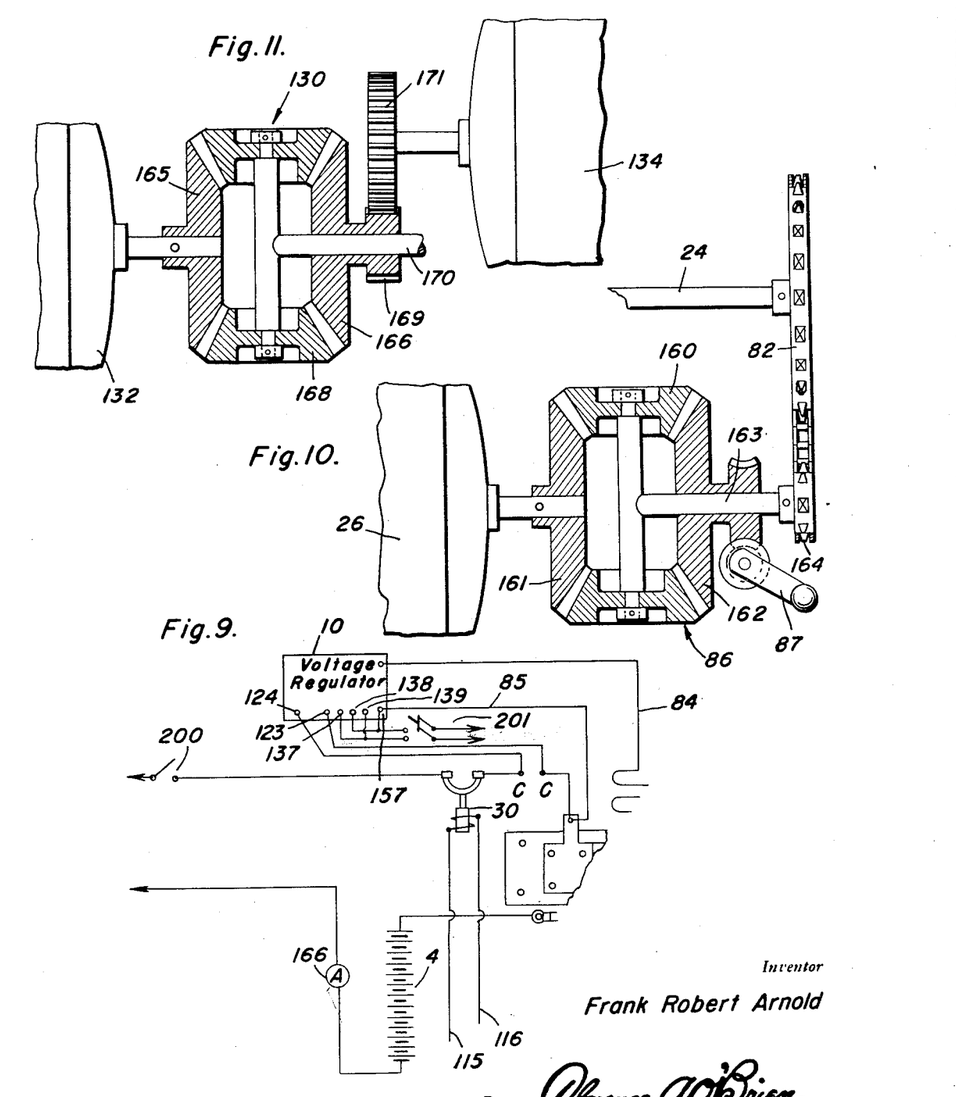
Figure 9 is a diagram illustrating a modification of the current supply arrangement shown in Figure 1, merely the modified portion of the said diagram being shown.
Figures 10 and 11 are diagrammatic sectional elevational views of two differentials which are used in connection with the driving means for the sliding contact and for the voltage regulator respectively.

The slidable contact 22 is moved at a constant rate or velocity by means of the screw threaded spindle 24 held in suitable bearings and driven by a gear 82 which meshes with the flying wheel 160 of a differential 86. The wheel 161 of the differential gear is driven by a synchronous or constant speed motor 26 while the second wheel 162 of the differential gear is driven by a hand lever 87. The third or output shaft of the differential gear carries gear wheel 164 which is coupled with the gear wheel 82 on the drive spindle 24.

The movement of the output shaft 163 of the differential gear is, as well known, a function of the sum algebraic of the two input movements. The hand lever permits initial fine adjustment of the charging rate by turning the handle clockwise or counter-clockwise until the carriage 18 is accurately opposite the desired position, and its use during the charge similarly permits adjustment or alteration of the charging current without interrupting it.

This operation will be readily understood if it is assumed, for instance, that the hand crank 87 is at rest; then, the constant speed drive of motor 26 is the input and shaft 24 is driven at constant speed accordingly. If the motor 26 is at rest, crank 87 may be turned in either direction to drive shaft 24 so as to change the position of carriage 18 towards the right or towards the left with a high degree of accuracy. Turning the hand crank with the motor 26 at rest is normally done to set the initial charging rate more accurately than it would be possible if the carriage is released and is moved down along its drive shaft 24. If the hand crank 87 is turned while the motor 26 is running a correction will be introduced to the position of the carriage to shift it further to the right or to the left, depending on the direction in which the crank 87 is turned, the magnitude depending upon how long the crank is turned. This latter method of operation is used to change the charging rate while the charging process is in progress. The synchronous or constant speed motor provides a driving means dependent on time. The operative circuit 88 of said motor includes a contact 56 arranged on a lever arm 89 which is operated by the end 75 of the push rod 74. It is connected with the two line terminals 90 and 91 and further includes a hand operated switch 92.

Finally the carriage 18 is provided with a pointer 96 fixedly attached to block 14 and indicating the position of the carriage and movable contact on a scale system 100 and 101 to be further described below.

The finishing rate selector 50 has the main purpose of fixing the time at which the battery should be charged at the finishing rate during a predetermined period which is usually fixed to an hour.

The finishing rate selector consists of a fixed insulating base plate 51, provided with a projecting arm 53 with a toothed edge 52. A U-shaped metal contact plate 54 rides on and may be moved over said base plate. A spring pressed ratchet arm 55 is pivotally mounted on a bracket 57 fixed on said contact plate which permits to adjust the position of the contact plate 54, as well as the insulator plate connected to it which forms the support for the contacts 56 and 58. The plate 54 rests on the side faces of the variable area resistor 31. Its front edge is preferably bevelled or provided with an incline to facilitate the lifting of the contact shoe 70 which is raised slightly when starting to glide upon the said plate. The front surface of the contact shoe may be bevelled correspondingly to further facilitate this movement.

A pointer 59 is attached to the contact plate 54 for cooperation with a scale system 100 and 101 described below to indicate the exact time at which the finishing rate period starts, and the magnitude of the finishing rate current. It also positions the time scale properly relatively to the current scale.

In the example shown in Figure 1 two cooperating scales 100 and 101 are illustrated, of which one is movable with respect to the other. The scale 100 which cooperates with the pointer 96 as well as with scale 101 and pointer 59 is a fixed scale which serves as a guide for scale 101 which is provided with suitable cuts and windows 102 to permit reading of scale 100.

Scale 101 is rigidly connected with the pointer 59 of the finish rate selector and may carry the hour scale, while scale 100 may indicate the rate of charge in amperes or the state of discharge which is numerically equal to the charging rate in ampere hours.

The pointer 96 in this case may be provided with means for cooperating with both scales 100 and 101 to indicate hours and the above named data.

The length of the finishing rate period for a charge when the current variation was determined in accordance with the principles as above set forth is theoretically always one hour, the charging current being interrupted by the contact arrangement operated by the contact operating rod 74 at the proper instant, as described below.

As illustrated in Figure 1, the contacts 56, 58 which are fixedly arranged on an insulated pedestal attached to the contact plate 54, together with the length of the rod 74, determines the cutting out of the arrangement after one hour's charging at the finishing rate.

The contact arrangement includes contact 56, already described, which controls the synchronous or constant speed motor 26 and which is arranged on a lever 89, fulcrumed at 105 and provided with a control arm 106. The lever may be under the pressure of a spring 107.

This contact controls the circuit 108 connected with flexible conductor 109 and terminal 90.

One of the contacts 58 is shown as mounted on a semi-circular spring 114 forming its actuation and control means and, at the same time providing the necessary spring tension to keep contacts 58 apart. The contacts 58 are connected with terminal 90 by means of conductor 109 and they control circuit 60 which includes conductor 111, an alarm bell 112, a switch 113, conductors 115 and 116, the solenoid switch 30, the coil of which is energized by said circuit, the flexible conductor 110 and terminal 91. Switch 30, as already described, interrupts the charging circuit 1, 2.

The contacts are operated by the push rod 74 mounted on the carriage 18. The reduced end 75 will pass the semi-circular spring 114 without actuating it; however, when the end 75 is about to press on control arm 106 of lever 89 so as to open contacts 56, the main portion of push rod 74 reaches spring 114 and upon further movement the spring will be pressed upwardly and the contacts 58 are closed, while contact 56 is opened. This closes circuit 60, whereby the bell is energized and switch 30 is operated to open the charging circuit. Simultaneously the circuit 88 of the motor is opened. The power supply in the example shown is an A. C. current supply.

It has been mentioned previously that the invention is based on an increasing resistance being produced in a part of the charging circuit, the voltage of which is kept constant. This regulation of the voltage in a certain part of the charging circuit is produced by the voltage regulator 10, which is shown in detail in Figure 2. This voltage regulator consists of the variable resistance 120 which comprises, as usual, a resistance tapped at a number of points, with contacts 121 arranged in a circle and connected with the said points, over which a rotating contact arm 122 moves. The rotating arm is connected with one of the terminals 123 carrying a connection with the generator field circuit, while the end of the resistance 120 is connected with the second terminal 124 which carries a connection with the generator field circuit. This connection is made for the purpose to have the rheostat in series with the generator field.

Figure 2:
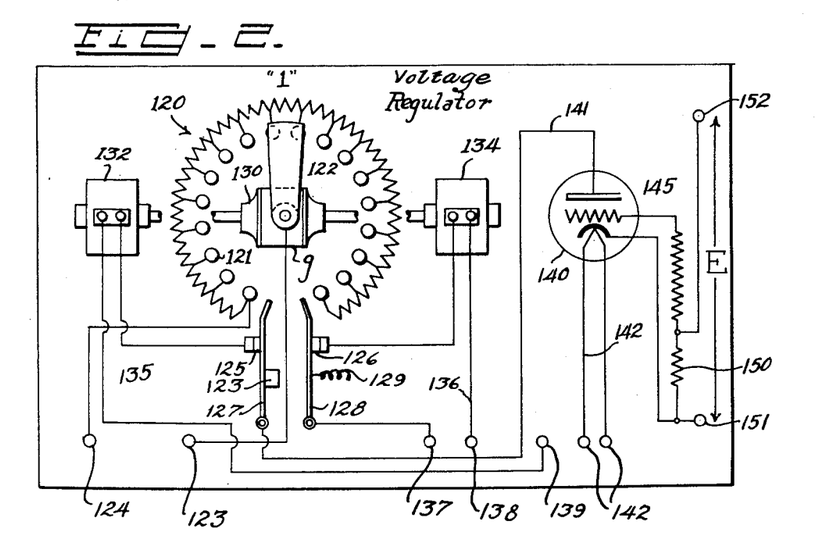
Figure 2 is a diagram of the voltage regulator showing the essential parts in a diagrammatic fashion and illustrating the electrical connections.

In addition, limit switches 125 and 126 are provided near the end positions of the rotating arm 122 which are operated by said arm when it reaches its extreme positions. These limit switches include contacts which are mounted on contact arms 127, 128. The arm 127 is provided with a reset button 123 while arm 128 is returned by a spring 129 when the rotating arm 122 leaves its extreme position.

The rotating arm 122 is driven by the flying gear wheel of a differential gear, diagrammatically indicated in Figure 2 at 130 and illustrated in Figure 11. The fixed gear wheels of the differential gear are driven by the swo motors 132 and 134 so arranged that motor 132 drives at a higher speed than motor 134.

The motor 132 drives the gear wheel 165 of the differential gear, while the second gear wheel 166 of the differential gear is driven by the slower driving motor 134 by means of gear wheels 169 and 171.

The planetary wheels 168 of the differential gear are connected with shaft 170 which drives the contact arm 122 of the rheostat.

With a suitable gear ratio between the gear wheels the rotation of the slower motor 134 when the motor 132 is not energized will cause the output shaft to turn at a rate which is equal to say one-half of the rate at which the slow motor turns. When both motors are running, the output shaft then turns at the rate which is equal to one-half of the difference between the rotations of motors 132 and 134.

The two motors and their gears are so arranged that they may run simultaneously. In this case, however, motor 132 is able to overtake motor 134, because motor 132 is so constructed that it runs faster than motor 134 under these conditions.

Motor 134 turns the rotary arm so as to increase the resistance in the circuit while motor 132 turns the arm 122 in the opposite direction so that the resistance will decrease. If both are running simultaneously the resistance will therefore decrease. The operative circuits 135 and 136 of the two motors 132 and 134 are controlled by the limit switches 125 and 126 so that the motors 132 and 134 are cut out when the arm reaches its extreme positions.

Circuit 136 for motor 134 is connected with terminals 137, 138 which in their turn are connected with a suitable A. C. line. The operative circuit 135 of motor 132 however is connected on one side with terminal 139 while on the other side this circuit includes not only limit switch 125 but also the plate circuit 141 of the electronic grid controlled rectifier tube 140. Motor 132 is a D. C. motor since it operates in response to the pulsating D. C. in the plate circuit of the tube 140. This pulsating D. C. arises from rectification of an A. C. supply to the plate circuit over terminals 139, 151.

The filament circuit 142 of the tube is connected with a suitable current supply preferably switched in by means, not shown, when the switch for the motor generator is closed.

The grid 145 of the tube is connected with a resistance 150 which provides the voltage drop E to be kept constant and the connection is made in such a way that this voltage drop acts as a negative grid bias which will just prevent the flow of current through the tube. However, if the voltage drop is below the required value of E, the tube will carry current. The terminals 151 and 152 which are connected with the resistance 150 are to be connected on the other side with the variable area conductor (at 37) and the movable contact 22 (at 69).

The system is provided with an ammeter, indicated diagrammatically at 166.

Figure 9 indicates the manner in which the battery charging apparatus described in the foregoing specification is connected to the mains of a direct current power supply which substitutes for the motor generator set. Lead 1 is connected to the positive wire of the main, and lead 3 is connected to the negative conductor. Connections are made between the terminals c—c to the contacts or terminal posts 123 and 124 of the voltage regulator so that the rheostat of the regulator is now in series with the charging circuit and regulates the charging current by means of the controlled variation of its ohmic value. Switch 200 is in the direct current main line. In all other respects this modification is identical with that already described in connection with Figure 1 and also the following description of the operation of the apparatus shown in Figure 1 is applicable to Figure 9.

The operation of the arrangement is already clear from the foregoing detailed description. It may be summarized as follows:

If the arrangement is operated more or less continuously, the last charging cycle should have left all parts in such a position that a new charging cycle can be started immediately. The operator, in this case, has opened switch 113 to stop bell 112, and has opened switch 92 to prevent motor 26 from being energized when carriage 18 is being reset for the next charge and before the charge is started. Switches 30, 123, and 126 will have been opened automatically. The rheostat of the regulator will be in its maximum resistance position. The battery or batteries should be placed in the charging circuit for the new charge, and the carriage 18 of the movable contact set to the position which is correct for the desired maximum initial current appropriate for the state of discharge of the battery. Moreover, the finishing rate selector 50 is set to the desired finishing rate. Switch 113 may be closed as soon as the carriage 18 is in position for the new charge. At the start, the switch 200 for the motor generator and switch 201 for the regulator operating current are closed. Likewise the switch for the filament current (not shown) is closed. As soon as the tube 140 is sufficiently heated, the main charging switch 30, the reset button 123, and the time motor switch 92 are closed in that order.

When limit switch 125 is closed (by means of reset button 123) an A. C. voltage is applied (through motor 132) to the plate of the rectifier tube 140. The generator field circuit is open, as the rotating arm 122 is in its extreme position. The voltage E across the resistance 150 is too small and therefore the tube 140 is fired. Current passes through circuits 141 and 135 and motor 132 and the latter now moves arm 122 so as to decrease the resistance.

When arm 122 leaves the limit switch 126 motor 134 starts to run, but as explained, the arm 122 is nevertheless moved in such a way that the resistance decreases as long as motor 132 runs and the tube 140 is conductive.

This decrease of resistance in the field circuit of the generator continues until the voltage drop equals its designed value. The current through the tube is then cut off and motor 134 now starts to increase the resistance in the field circuit of the generator. The voltage drop E again decreases when the field is weakened, the tube again fires and the motor 132 is again energized. The arm 122 will therefore be permanently "hunting" for its proper position.

The charging process, once the synchronous or constant speed motor 26 has been started, is completely automatic. The movable contact moves along at a constant speed and the increase of the resistance due to the tapering off of the resistor 31 and to the moving of the contact towards the tapering end of said resistor in conjunction with the constant value of the voltage drop across the switched in portion of the resistor keeps the charging current at the maximal permissible value during the entire process. In the end the moving contact reaches the finishing rate selector where the finishing rate is held constant for one hour thus completing a normal charge. In the meantime motor 26 has driven the carriage 18 to its end position in which push rod 74 trips contacts 56 and 58. The alarm bell rings and switch 30 opens the charging circuit. Moreover, motor 26 is cut out. The current is now cut off and as the voltage drop E is now zero the tube will fire and motor 132 drives the arm 122 continuously to its end position, opening the limit switch 125 and the tube and motor circuit 135. Motor 134 now running alone moves the arm to the opposite end opening limit switch 126 and keeping it open, thus stopping motor 134.

It will be observed that the resistance arm is left exactly in the position which it is supposed to have when the operation starts.

The operator or attendant has therefore merely to open the switches 113 and 192 before resetting the carriage by lifting the lever 29a and to get ready for the next charge.

The invention has been shown with many details, the construction of which is merely indicated, as it is not material. It is to be understood that the construction of the components may be selected in any approved or appropriate way and that the invention is connected with these constructional details merely insofar as certain conditions must be fulfilled by them. They are therefore subject to change, a change which will however not affect the essence of the invention.

I claim:

1. A battery charging system for lead batteries comprising a charging circuit for the battery, means to provide said circuit with current, a resistor of variable cross sectional area within said charging circuit, a sliding contact connected with said charging circuit, means for moving said contact along said variable area resistor from larger to smaller cross sections with constant speed and a voltage regulator for the voltage of the current in the charging circuit, keeping the voltage in the portion of the said variable area conductor which forms part of the charging circuit, at a constant value.

2. A battery charging system for lead batteries comprising a charging circuit for the battery, means to provide said circuit with current, a resistor of variable cross sectional area within said charging circuit, a sliding contact connected with said charging circuit, means for moving said contact along said variable area resistor from larger to smaller cross sections with constant speed and an adjustable finishing rate selector placed in the path of the movable contact, and a voltage regulator for the voltage of the current in the charging circuit, keeping the voltage in the portion of the said variable area conductor which forms part of the charging circuit at a constant value.

3. A battery charging system for lead batteries comprising a charging circuit for the battery, means to provide said circuit with current, a resistor of variable cross sectional area within said charging circuit, a sliding contact connected with said charging circuit, means for moving said contact along said variable area resistor from larger to smaller cross sections with constant speed and an adjustable finishing rate selector placed in the path of the movable contact, means for driving the movable contact including a synchronized motor and an operative circuit therefor, means associated with the movable contact for opening the circuit of the motor after passage of the said contact over the finishing rate selector and a voltage regulator for the voltage of the current in the charging circuit, keeping the voltage in the portion of the said variable area conductor which forms part of the charging circuit at a constant value.

4. A battery charging system for lead batteries, comprising a charging circuit for the battery, means to provide said circuit with current, a resistor of variable cross sectional area within said charging circuit, a sliding contact connected with said charging circuit, means for moving said contact along said variable area resistor from larger to smaller cross sections with constant speed and a finishing rate selector placed in the path of the movable contact, means for adjusting the position of said finishing selector with respect to the variable area conductor and a voltage regulator for the voltage of the current in the charging circuit, keeping the voltage in the portion of the said variable area conductor which forms part of the charging circuit at a constant value.

5. A battery charging system for lead batteries comprising a charging circuit for the battery, means to provide said circuit with current, a resistor of variable cross sectional area within said charging circuit, a sliding contact connected with said charging circuit, means for moving said contact along said variable area resistor from larger to smaller cross sections with constant speed, said means for moving said contact, including a synchronized motor, a screw threaded spindle, driven by said motor and a carriage having screw threaded blocks adapted to engage said spindle, and a voltage regulator for the voltage of the current in the charging circuit, keeping the voltage in the portion of the said variable area conductor which forms part of the charging circuit, at a constant value.

6. A battery charging system for lead batteries comprising a charging circuit for the battery, means to provide said circuit with current, a resistor of variable cross sectional area within said charging circuit, a sliding contact connected with said charging circuit, means for moving said contact along said variable area resistor from larger to smaller cross sections with constant speed during the charging period of the battery, said means including a synchronized motor, an operative circuit therefor, a screw threaded spindle driven by said motor and a carriage with screw threaded blocks, adapted to engage said spindle, an alarm signal, a solenoid switch in the charging circuit of the battery, controlled by said alarm circuit, contacts operated by said carriage at the termination of the charging period, controlling said alarm circuit and said operative circuit of the synchronized motor for closing said alarm circuit and for opening the operative circuit of the synchronized motor, and a voltage regulator for the voltage of the current in the charging circuit, keeping the voltage in the portion of the variable area conductor which forms part of the charging circuit at a constant value.

7. A battery charging system for lead batteries comprising a charging circuit for the battery, means to provide said circuit with current, a resistor of variable cross sectional area within the charging circuit, consisting of a conducting body of equal width having a height steadily diminishing along its length, with two parallel lateral surfaces, a movable sliding contact applied against one of said lateral surfaces, means for moving said contact along said surface from larger to smaller cross sectional areas with constant speed, said contact being connected with the charging circuit, and a voltage regulator connected with the largest cross sectional area and with the movable contact, regulating the voltage in the charging circuit by keeping the voltage drop in the portion of the variable area conductor which is included in the charging circuit at a constant value.

8. A battery charging system as specified in claim 7 in which the variable area resistor consists of two sections, of equal and constant width, one section being of constant height and the other section being of a height diminishing along an exponential curve along its length, and a lug for electric connection with the voltage regulator on the first named section.

9. A battery charging system as specified in claim 7 wherein the variable area resistor consists of two conducting sections of equal and constant width, one section being of constant height and the other section being of a height diminishing along an exponential curve along its length, and an insulating shield of smaller width than the conductive body provided with a cut accommodating said body.

10. A battery charging system for lead batteries comprising a charging circuit for the battery, means to provide said circuit with current, a resistor of variable cross sectional area within said charging circuit, a sliding contact connected with said charging circuit, means for moving said contact along said variable area resistor from larger to smaller cross sections with constant speed and an adjustable finishing rate selector comprising an insulating base sheet and a movable contact plate riding on said sheet and adapted to be placed alongside said variable area conductor, means for adjusting the position of said contact plate relatively to the variable area conductor and a voltage regulator for the voltage of the current in the charging circuit, keeping the voltage in the portion of the said variable area conductor which forms part of the charging circuit at a constant value.

11. A battery charging system for lead batteries comprising a charging circuit for the battery, means to provide said circuit with current, a resistor of variable cross sectional area within said charging circuit, a sliding contact connected with said charging circuit, means for moving said contact along said variable area resistor from larger to smaller cross sections with constant speed during the charging period of the battery, said means including a synchronized motor, a screw threaded spindle driven by said motor, a carriage with a screw threaded block engaging said spindle and driven by said spindle, a pointer attached to said carriage, an adjustable fixed scale, a finishing rate selector including an adjustable contact plate, and a pointer member carried by the same, a movable scale attached to said pointer member and gliding on the first named scale, the pointer on the carriage cooperating with both scales and a voltage regulator for the voltage of the current in the charging circuit, keeping the voltage in the portion of the said variable area conductor which forms part of the charging circuit at a constant value.

12. A battery charging system for lead batteries comprising a charging circuit for the battery, means to provide said circuit with current, a resistor of variable cross sectional area within said charging circuit, a sliding contact connected with said charging circuit, means for moving said contact along said variable area resistor from larger to smaller cross sections with constant speed and a voltage regulator for the voltage of the current in the charging circuit, for keeping the voltage drop in the portion of said variable area conductor which forms part of the charging circuit at a constant value, said voltage regulating system comprising an adjustable resistance, influencing the voltage of the charging circuit, means for increasing and decreasing said resistance, said means for decreasing the resistance being rendered operative by a drop of the voltage to be regulated below a certain value.

13. A battery charging system for lead batteries comprising a charging circuit for the battery, means to provide said circuit with current, a resistor of variable cross sectional area within said charging circuit, a sliding contact connected with said charging circuit, means for moving said contact along said variable area resistor from larger to smaller cross sections with constant speed and a voltage regulator for the voltage of the current in the charging circuit of the battery, keeping the voltage drop in the portion of the variable area conductor which forms part of the charging circuit at a constant value, said voltage regulator comprising an adjustable resistance, influencing the voltage of the charging circuit, a movable contact arm, means for increasing said resistance, including a motor, driving said arm, means for decreasing the resistance including another motor, driving said arm, operative circuits for said motors, the operative circuit of the last named motor including an electronic tube, and means to make said tube conductive and to operate the motor, connected with it, dependent on the voltage drop to be regulated.

14. A battery charging system for lead batteries comprising a charging circuit for the battery, means to provide said circuit with current, a resistor of variable cross sectional area within said charging circuit, a sliding contact connected with said charging circuit, means for moving said contact along said variable area resistor from larger to smaller cross sections with constant speed and a voltage regulator for the voltage of the current in the charging circuit at a constant value, said voltage regulator comprising an adjustable resistance, influencing the voltage of the charging circuit, a movable contact arm, means for increasing said resistance, including a motor driving said arm, means for decreasing the resistance including another motor driving said arm, said motors driving the arms with unequal speed, with the motor decreasing the resistance prevailing over the motor increasing the resistance, operative circuits for said motors, the operative circuit of the motor decreasing the resistance containing an electronic tube, a grid therein, a grid circuit with a resistance biased by the voltage drop along said resistance, said resistance being connected with the variable area conductor and with the movable contact.

15. A battery charging system for lead batteries comprising a charging circuit for the battery, means to provide said circuit with current, a resistor of variable cross sectional area within said charging circuit, a sliding contact connected with said charging circuit, means for moving said contact along said variable area resistor from larger to smaller cross sections with constant speed and a voltage regulator for the voltage of the current in the charging circuit of the battery keeping the voltage drop in the portion of the variable area conductor which forms part of the charging circuit at a constant value, said voltage regulator comprising an adjustable resistance, influencing the voltage of the charging circuit, a rotatable contact arm, a differential gear for driving said contact arm, a motor driving said differential gear in one direction, so as to decrease the active resistance, a further motor driving said differential gear in the opposite direction, so as to increase the active position of said resistance, operative circuits for said motors, limiting switch contacts near the end positions of said rotatable arm, controlling the operative circuits of said motors, an electronic tube in the circuit of the motor decreasing the resistance, a control grid within said electronic tube, preventing the passage of current when a predetermined grid bias is reached, a grid circuit, a grid biasing resistance therein, said resistance being connected with the variable area conductor and with the movable contact.

FRANK ROBERT ARNOLD.

REFERENCES CITED

The following references are of record in the file of this patent:

UNITED STATES PATENTS

| Number | Name | Date |
|---|---|---|
| 1,019,483 | Kennedy | Mar. 15, 1912 |
| 1,157,028 | Noble | Oct. 19, 1915 |
| 1,224,986 | Wilson | May 8, 1917 |
| 1,284,223 | Bliss | Nov. 12, 1918 |
| 1,323,176 | Ebeling | Nov. 25, 1919 |
| 1,733,560 | Scruby | Oct. 29, 1929 |
| 1,868,046 | Cole | July 19, 1932 |
| 1,971,053 | Ruben | Aug. 21, 1934 |
| 1,979,440 | Benit | Nov. 6, 1934 |
| 2,158,979 | Breisch | May 16, 1939 |
| 2,165,040 | Exner | July 4, 1939 |
| 2,227,118 | Amsden | Dec. 31, 1940 |
| 2,258,607 | Grabau | Oct. 14, 1941 |
| 2,407,326 | Patterson | Sept. 10, 1946 |